United States Patent
Schaedler et al.

(10) Patent No.: US 11,141,878 B1
(45) Date of Patent: Oct. 12, 2021

(54) FUGITIVE CERAMIC MOLD, FORMULATIONS AND METHOD FOR INVESTMENT CASTING

(71) Applicant: HRL Laboratories, LLC, Malibu, CA (US)

(72) Inventors: Tobias A. Schaedler, Oak Park, CA (US); Zak C. Eckel, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 210 days.

(21) Appl. No.: 16/218,047

(22) Filed: Dec. 12, 2018

Related U.S. Application Data

(60) Provisional application No. 62/622,535, filed on Jan. 26, 2018.

(51) Int. Cl.
  *C04B 35/565* (2006.01)
  *C04B 35/571* (2006.01)
  (Continued)

(52) U.S. Cl.
  CPC .............. *B28B 1/001* (2013.01); *B22C 7/02* (2013.01); *B22C 9/043* (2013.01);
  (Continued)

(58) Field of Classification Search
  CPC ....... C04B 35/5603; B29C 33/38; B22C 1/00; B22C 1/02; B22C 1/04; B22C 1/06;
  (Continued)

(56) References Cited

U.S. PATENT DOCUMENTS

| | | | | |
|---|---|---|---|---|
| 5,328,976 A | * | 7/1994 | Leung | C03C 3/045 528/31 |
| 5,376,595 A | * | 12/1994 | Zupancic | C03C 3/045 501/12 |

(Continued)

OTHER PUBLICATIONS

Jacob M. Hundley et al., "Geometric characterization of additively manufactured polymer derived ceramics," Additive Manufacturing, vol. 18 (2017) pp. 95-102.

(Continued)

*Primary Examiner* — Karl E Group
(74) *Attorney, Agent, or Firm* — Lewis Roca Rothgerber Christie, LLP

(57) ABSTRACT

A method and a fugitive mold for producing a cast-metal part are provided. In some embodiments, the fugitive mold may be formed by three-dimensionally (3D) printing a preceramic resin in the shape of a fugitive mold; curing the preceramic resin to form a preceramic polymer, and pyrolyzing the fugitive mold to convert the preceramic polymer to a metastable ceramic material. The metastable ceramic material may include an amorphous silicon oxycarbide ceramic. A cast-metal part may be formed by filling the fugitive mold with a liquid metal or alloy, and allowing the liquid metal or alloy to solidify over a first length of time. The cast-metal part may then be retrieved by heating the fugitive mold at a temperature lower than the melting point of the cast-metal part for a second length of time longer than the first length of time to disintegrate the metastable ceramic material.

19 Claims, 4 Drawing Sheets
(4 of 4 Drawing Sheet(s) Filed in Color)

(51) Int. Cl.
*B22C 9/00* (2006.01)
*B28B 1/00* (2006.01)
*C04B 35/56* (2006.01)
*C04B 35/626* (2006.01)
*B22C 9/04* (2006.01)
*B22C 7/02* (2006.01)
*B33Y 10/00* (2015.01)
*B33Y 70/00* (2020.01)
*B33Y 80/00* (2015.01)

(52) U.S. Cl.
CPC ........ *C04B 35/5603* (2013.01); *C04B 35/565* (2013.01); *C04B 35/571* (2013.01); *C04B 35/6267* (2013.01); *B33Y 10/00* (2014.12); *B33Y 70/00* (2014.12); *B33Y 80/00* (2014.12); *C04B 2235/3895* (2013.01); *C04B 2235/6026* (2013.01); *C04B 2235/722* (2013.01); *C04B 2235/725* (2013.01); *C04B 2235/726* (2013.01); *C04B 2235/945* (2013.01)

(58) Field of Classification Search
CPC .. B22C 1/08; B28B 7/34; B28B 7/342; C03C 3/045
See application file for complete search history.

(56) References Cited

U.S. PATENT DOCUMENTS

| | | | |
|---|---|---|---|
| 8,822,360 B2* | 9/2014 | Schmidt | F02K 1/386 501/87 |
| 2016/0107331 A1* | 4/2016 | Schmidt | C08K 9/04 264/401 |
| 2016/0207836 A1* | 7/2016 | Land | C04B 35/56 |
| 2016/0208412 A1* | 7/2016 | Sandgren | C30B 29/06 |
| 2017/0204227 A1 | 7/2017 | Eckel | |
| 2018/0148379 A1 | 5/2018 | Schaedler et al. | |
| 2018/0148380 A1* | 5/2018 | Eckel | C04B 35/14 |
| 2020/0290931 A1* | 9/2020 | Eckel | B33Y 80/00 |

OTHER PUBLICATIONS

Zak C. Eckel et al., "Additive manufacturing of polymer-derived ceramics," Science, vol. 351, Issue 6268, Jan. 1, 2016, pp. 58-62.

* cited by examiner

FUGITIVE CERAMIC MOLD, FORMULATIONS AND METHOD FOR INVESTMENT CASTING

CROSS-REFERENCE TO RELATED APPLICATION(S)

This application claims priority to and the benefit of U.S. Provisional Application No. 62/622,535, filed Jan. 26, 2018 and titled "FUGITIVE CERAMIC MOLD, FORMULATIONS AND METHOD FOR INVESTMENT CASTING", the entire content of which is incorporated herein by reference.

FIELD

The present disclosure relates generally to investment casting, and more specifically to an investment casting mold and method of producing an investment casting mold.

BACKGROUND

Investment casting is a technique for producing metal or alloy parts. The technique relies on filling a hollow mold with a molten metal or alloy that can subsequently solidify into a part having a desired shape. The mold-embedded solidified part is then mechanically or chemically separated from the mold. To be effective, the separation process should fully and cleanly separate the part from the mold without causing damage to the metal or alloy part. As such, the ease of separation may be affected by the materials used to form the mold.

Ceramic molds, and in particular, silica-based ceramic molds, have been used for producing metal or alloy parts. Such molds are typically removed by chemical etching to dissolve the mold. However, such processes are slow and expensive, and produce large volumes of toxic and corrosive liquid waste. Furthermore, such processes are only compatible with a limited number of alloys that are not affected by the etching. As such, the use of ceramic molds for investment casting of metal and alloy parts has been limited.

SUMMARY

Aspects of embodiments of the present disclosure provide a method of producing a cast-metal part including: three-dimensionally (3D) printing a preceramic resin in the shape of a fugitive mold; curing the preceramic resin to form a preceramic polymer; pyrolyzing the fugitive mold to convert the preceramic polymer to a metastable ceramic material; filling the fugitive mold with a liquid metal or alloy; allowing the liquid metal or alloy to solidify over a first length of time to form the cast-metal part embedded in the fugitive mold; and heating the fugitive mold at a temperature lower than the melting point of the cast-metal part for a second length of time longer than the first length of time to disintegrate the metastable ceramic material.

In some embodiments, 3D printing may be achieved by stereolithography. In some embodiments, 3D printing may be achieved by direct ink write (DIW).

In some embodiments, pyrolyzing may be carried out at about 800° C. to about 1100° C. under an inert atmosphere.

In some embodiments, allowing the liquid metal or alloy to solidify may further include actively cooling the liquid metal or alloy.

In some embodiments, heating the fugitive mold may be carried out for about 4 hours to about 12 hours at a temperature about 10% to about 50% lower than the melting point of the cast-metal part.

In some embodiments, heating the fugitive mold may be carried out under an atmospheric pressure of less than about 0.25 bar.

In some embodiments, the metastable ceramic material may be an amorphous silicon oxycarbide ceramic. The amorphous silicon oxycarbide ceramic may include silicon in an amount of about 10 to 60 atom %, carbon in an amount of about 10 to 60 atom %, and oxygen in an amount of about 10 to 60 atom %. In some embodiments, the amorphous silicon oxycarbide ceramic may include silicon in an amount of about 10 to 30 atom %, carbon in an amount of about 20 to 40 atom %, and oxygen in an amount of about 30 to 50 atom %.

In some embodiments, the amorphous silicon oxycarbide ceramic may further include nitrogen in an amount of about 1 to 20 atom %.

In some embodiments, the amorphous silicon oxycarbide ceramic may further include boron in an amount of about 1 to 20 atom %.

In some embodiments, the amorphous silicon oxycarbide ceramic may further include a metal in an amount of about 1 to 20 atom %.

In some embodiments, the amorphous silicon oxycarbide ceramic may further include sulfur in an amount of about 1 to 20 atom %.

In some embodiments, the amorphous silicon oxycarbide ceramic may further include hydrogen in an amount of about 1 to 20 atom %.

Aspects of embodiments of the present disclosure provide a fugitive mold for producing a cast-metal part. A solid portion of the fugitive mold includes a three-dimensionally (3D) printed metastable ceramic material; the metastable ceramic material being removable from the cast-metal part by a heat-induced phase change. In some embodiments, the metastable ceramic material includes an amorphous silicon oxycarbide ceramic.

In some embodiments, the solid portion may include the metastable ceramic material in an amount of greater than about 50% by volume, and the remaining volume of the solid portion may include particles of a non-metastable ceramic material.

In some embodiments, the amorphous silicon oxycarbide ceramic may include silicon in an amount of about 10 to 60 atom %, carbon in an amount of about 10 to 60 atom %, and oxygen in an amount of about 10 to 60 atom %.

In some embodiments, the fugitive mold may include a core defining an interior feature of the cast-metal part. In some embodiments, the fugitive mold may include one or more cooling channels to be formed in the cast-metal part.

BRIEF DESCRIPTION OF THE DRAWINGS

The patent or application file contains at least one drawing executed in color. Copies of this patent or patent application publication with color drawings will be provided by the Office upon request and payment of the necessary fee.

The features and advantages of embodiments of the present disclosure will be better understood by reference to the following detailed description when considered in conjunction with the accompanying drawings.

DETAILED DESCRIPTION

Figure 1:
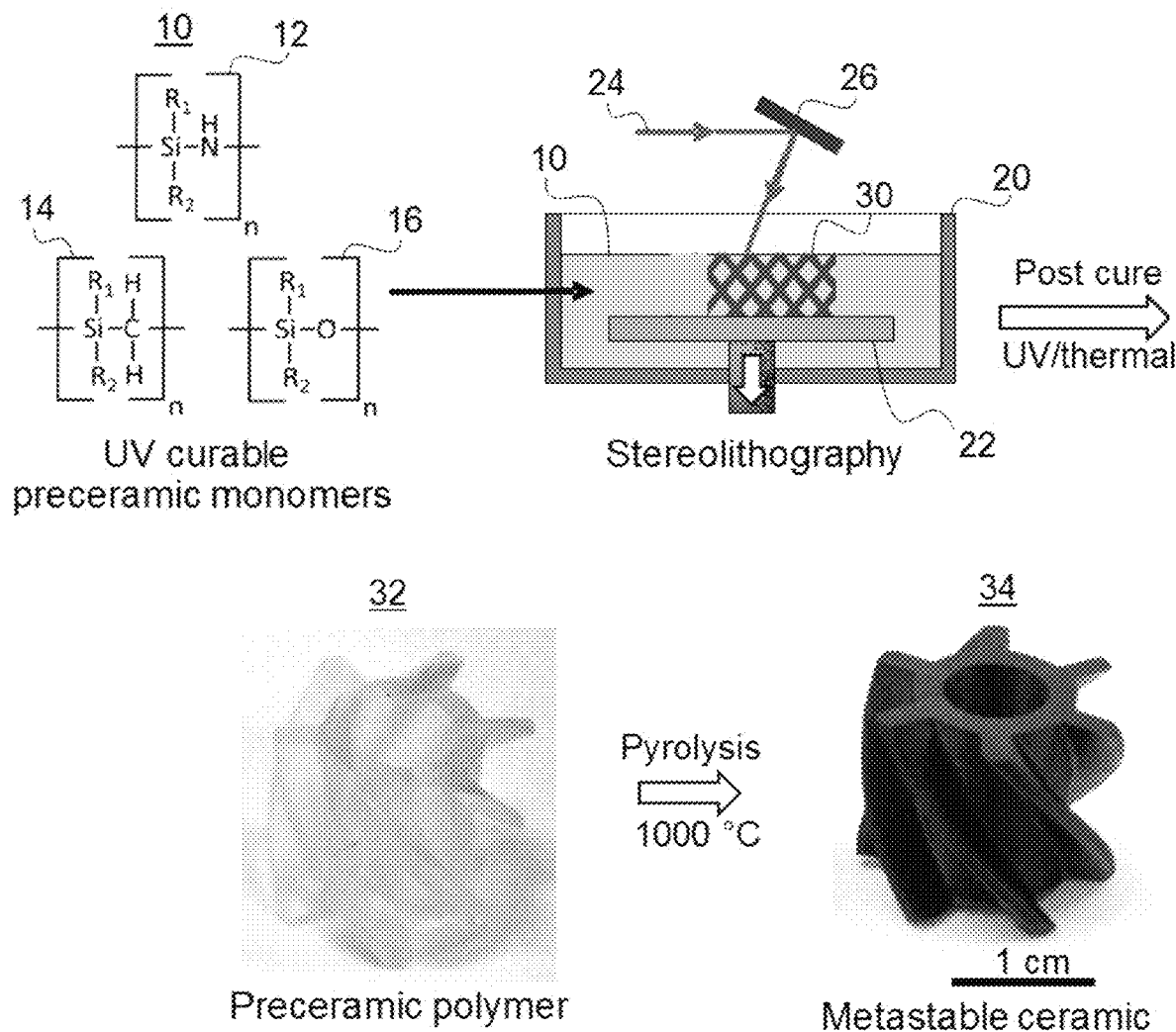
FIG. 1 is a schematic flowchart diagram describing the use of a ultraviolet (UV) curable preceramic resin in a stereolithography (SLA) device to form the solid portion of a three-dimensional (3D) printed fugitive mold according to embodiments of the present disclosure.

In the following detailed description, only certain example embodiments of the subject matter of the present disclosure are shown and described, by way of illustration. As those skilled in the art would recognize, the subject matter of the present disclosure may be embodied in many different forms, and should not be construed as being limited to the embodiments set forth herein.

In the context of the present application, when a first element is referred to as being "on", "coupled to", or "connected to" a second element, it can be directly on, directly coupled to, or directly connected to the second element; or it can be indirectly on, indirectly coupled to, or indirectly connected to the second element with one or more intervening elements interposed therebetween. It will be understood that when a first element is referred to as being "directly on", "directly coupled to", or "directly connected to" a second element, no intervening elements are present. Like reference numerals designate like elements throughout the specification, and duplicative descriptions may not be provided. The thicknesses and dimensions of layers, films, panels, regions, etc., may be exaggerated in the drawings for clarity. The drawings are not necessarily drawn to scale.

In the drawings, designations such as thickness direction (TD) and planar direction (PD) may be provided for ease of reference to the relative orientations of elements in the illustrated embodiments. Such directional designations are relative to the orientation of the embodiment depicted in each drawing, and are not related to any absolute coordinate system. It will be understood that the directional designations do not limit the orientations of embodiments of the present disclosure. For example, the illustrated embodiments could be rotated along with their directional designations. In general, unless otherwise stated, the thickness direction will be understood to be substantially orthogonal to the planar direction.

It will be understood that references herein to metals may also encompass alloys and vice versa, even if both types or kinds of material are not explicitly referenced. For example, references to embodiments of cast-metal parts may additionally encompass cast-alloy parts. For example, the term "metal" may include a material substantially composed of a single major metallic element, as well as a material composed of a mixture of or including metallic elements.

Fugitive molds (e.g., molds or casting molds) are often used for investment casting of metal and/or alloy parts. Such molds provide a supportive structure around the outer perimeter of a part to be formed, and are used to define the shape of the part. The molds are typically composed of a material (for example, a ceramic material) that does not bond to, disintegrate, dissolve, mix, or react with the metal or alloy, such that the mold is able to maintain structural integrity at the temperatures required for liquefaction of the part material. Accordingly, the mold maintains a consistent shape during formation of the part. The fugitive mold is then separated from the part after solidification of the metal or alloy to allow for further processing and/or completion of manufacture.

As used herein, the term "ceramic" refers to any material in the class of inorganic (e.g., non-organic) and non-metallic solids comprising or including a network of metal, non-metal, and/or metalloid atoms held together via ionic and/or covalent bonds. Ceramic materials may be crystalline, semi-crystalline, or amorphous. Non-limiting examples of ceramic materials may include metal oxides, boride, carbides, and nitrides, such as silicon carbide, silicon nitride, zirconium oxide, and the like.

The scope of parts that can be formed by investment casting in fugitive molds has been limited by existing ceramic technology in several respects. For example, ceramic molds are often separated from their metal and alloy products via chemical etching to dissolve the mold. Such etching processes are slow and expensive, and can produce large volumes of toxic and corrosive liquid waste. Furthermore, such processes are compatible with only a limited number of alloys that are resistant to the etching. Accordingly, there is a desire for fugitive molds that can be removed using alternative methods that are cheaper, faster, cleaner, and more compatible with a wider range of metal materials. Ideally, such molds would also be capable of producing metal parts with complex shapes and/or internal features, but ceramic molds formed by conventional methods cannot be easily machined or cast in complex forms. A fugitive mold capable of use with a wider range of metals and alloys to form a wider range of shapes and features would thus be advantageous for metal part production in many industries.

Aspects of embodiments of the present disclosure provide a method for producing a cast-metal part, and a fugitive mold for producing a cast-metal part. In some embodiments, a fugitive mold for producing a cast-metal part includes a solid portion including a three-dimensionally (3D) printed metastable ceramic material that is removable from the cast-metal part by a heat-induced phase change. The metastable ceramic material may include an amorphous silicon oxycarbide ceramic. In some embodiments, the fugitive mold may be formed by three-dimensionally (3D) printing a preceramic resin in the shape of a fugitive mold, curing the preceramic resin to form a preceramic polymer, and pyrolyzing the fugitive mold to convert the preceramic polymer to a metastable ceramic material. The cast-metal part may be formed by filling the fugitive mold with a liquid metal or alloy and allowing the liquid metal or alloy to solidify over a first length of time. The cast-metal part may then be retrieved or released by heating the fugitive mold at a temperature lower than the melting point of the cast-metal part for a second length of time longer than the first length of time to disintegrate the metastable ceramic material; and in some cases physically separating the cast-metal part from fragments of the fugitive mold. The metastable ceramic material that forms the solid portion of the fugitive mold may be selected to withstand the high temperature of the molten metal (e.g., in excess of 1500° C.) while the metal solidifies during the casting process. However, the selected metastable ceramic material may also be at least partially transformed into gases and particles of a different phase, such as a crystalline phase, upon longer exposures to high temperatures, thereby losing its structural integrity and facilitating removal from the cast-metal part. Various embodiments of the present disclosure therefore enable the rapid production and use of ceramic fugitive molds that can encompass complex shapes and internal features such as cores, holes, and cooling channels, and that can be easily removed from the cast-metal product.

The terms "metastable" and "thermodynamically metastable" may be interchangeably used herein to refer to a material that may appear to be energetically stable within a limited range of thermodynamic (temperature) conditions on a limited timescale, but is capable of being converted to another state or phase upon exposure to elevated temperatures on longer (prolonged) timescales. The term "phase" is used herein in its art-recognized sense to refer to a material or system having a homogenous and physically distinctive material state, for example, a particular arrangement of atoms or components, that can be distinguished from other states having the same atoms or components in a different physical arrangement and with different physical properties. The metastable material may thus be described as occupying a local minimum on a reaction coordinate plot or energy surface and having a non-zero reaction potential for conversion to other phases, as the metastable material is not in a state of true thermodynamic equilibrium.

As used herein, the term "3D printing" refers to any manufacturing process in which parts are formed via additive, stepwise deposition of layers of material. 3D printing is directly analogous to two-dimensional (2D) printing, and the two differ primarily in the dimensionality of the manufactured product. In 2D printing, planar images and text are produced by successively depositing parallel lines of ink shifted along a single axis. In 3D printing, an ink having a defined depth along the z-axis is deposited in a first plane according to substantially the same process for 2D printing to produce a 2D object, then subsequently in adjacent, parallel planes shifted along the z-axis to thereby produce a 3D volume.

3D printing may be carried out using various suitable techniques, and embodiments of the present disclosure are not necessarily limited to any particular technique. In some embodiments, for example, 3D printing may refer to direct ink write (DIW) or extrusion printing, in which a viscous ink is deposited by a print head on a substrate, and the formed layers are solidified by curing. In some embodiments, 3D printing may refer to stereolithography (SLA), in which parts are manufactured via layer by layer deposition of a solid material formed by solidifying a liquid feedstock. In SLA, the material to be deposited is typically provided as a reservoir of liquid resin. Thin layers of the liquid resin may be polymerized (e.g., cured) and deposited on a build platform when the liquid resin is exposed to radiation (e.g., light) having a suitable wavelength, for example, UV light. The UV light may be controlled using, for example, UV laser rastering, digital light projection (DLP), liquid crystal display projection (LCDP), or projection-micro-stereolithography. However, embodiments of the present disclosure are not limited thereto, and other suitable 3D methods may be used, including binder jetting, resin jetting with fiber placement, vat polymerization, fused deposition modeling (FDM), etc.

As used herein, the term "preceramic" refers to a non-ceramic material that can be heated, pyrolyzed, and/or oxidized at an elevated temperature (e.g., above 200° C., for example, about 400° C. to about 1200° C., or about 800° C. to about 1100° C.) to thereby produce a ceramic material. In some embodiments, the term may be used to refer to a resin and/or a polymer. In some embodiments, the preceramic material may be a resin that is capable of forming a polymer.

As used herein, the term "resin" may refer to a liquid solution or mixture including one or more monomers, oligomers, and/or crosslinkers that may be polymerized or "cured" to form a solid polymer network. The polymerization or curing may be triggered by any suitable mechanism, including energy input in the form of light or heat, and/or evaporation of a carrier solvent. In some embodiments, the polymerization reactions may occur upon exposure to light radiation of a suitable wavelength (e.g., UV light), and the resin may be alternatively referred to as a "photopolymer resin".

The term "solid portion", as used herein to describe embodiments of the fugitive mold, may refer to the portion of the mold that surrounds and defines the shape of the cast-metal part to be formed in the mold. The solid portion stands in contrast to the "fillable portion" in the interior of the fugitive mold that corresponds to the shape of the cast-metal part. The fillable portion is empty (filled with air or vacuum) when not in use, and is subsequently filled with liquid metal or alloy during the investment casting process.

In some embodiments, a method of producing a cast-metal part may start by 3D printing a preceramic resin in the shape of a fugitive mold. For example, the solid portion of the fugitive mold may be formed by 3D-printing a preceramic resin.

The preceramic resin used to form the solid portion of the fugitive mold may be any resin that is capable of producing a metastable ceramic material, as will be discussed in more detail below. For example, the preceramic resin may be cured to form a preceramic polymer that is subsequently converted to a ceramic material according to embodiments described herein.

The preceramic resin may include one or more polymerizable monomers, oligomers, and/or crosslinkers as described above. Typically, each component of the preceramic resin may be a molecule having at least one organic functional group capable of one or more intermolecular bond-forming reactions, where the cascade of intermolecular reactions results in formation of a polymer network. The one or more polymerizable monomers, oligomers, and/or crosslinkers may include any combination of organic functional groups capable of forming a suitable polymer network under relevant curing conditions, as further described below.

At least one of the monomers, oligomers, and/or crosslinkers included in the preceramic resin may include one or more inorganic atoms or groups, as required to form the composition of the ceramic material. For example, the inorganic atom or group may form a component of the ceramic network after the preceramic resin is converted into a ceramic material. As used herein, the term "inorganic" contrasts with the term "organic", and may be used to refer to any atom, element, or group including elements other than carbon (C) and carbon-bound hydrogen (H). Non-limiting examples of such inorganic elements may include main group elements such as silicon (Si), aluminum (Al), boron (B), nitrogen (N), and phosphorus (P); alkaline earth metal elements such as magnesium (Mg), barium (Ba), calcium (Ca), and strontium (Sr); and transition metal elements such as titanium (Ti), nickel (Ni), cobalt (Co), iron (Fe), manganese (Mn), zirconium (Zr), and hafnium (Hf).

In some embodiments, the inorganic atoms and groups may be or include Si, and the Si atoms may be included in the form of a siloxide, siloxane, or silane group. Accordingly, in some embodiments, the preceramic resin may include Si, oxygen (O), and carbon (C) atoms.

Example organic functional group structures and combinations, preceramic resin formulations, and additional aspects of both are described in, e.g., U.S. patent application Ser. Nos. 15/822,197 and 15/822,199, both filed in the U.S.

Patent and Trademark Office on Nov. 26, 2017; and U.S. patent application Ser. No. 15/406,762, filed in the U.S. Patent and Trademark Office on Jan. 15, 2017, the entire contents of each of which are incorporated herein by reference. However, it will be understood that embodiments of the present disclosure are not limited to the formulations or methods described in these references.

In some embodiments, the preceramic resin may further include a filler material. As used herein, the term "filler material" refers to an additive that does not react with the one or more monomers, oligomers, and/or crosslinkers in the preceramic resin to become a repeating unit of the resulting preceramic polymer, but is mixed in with those components so that the polymer formed from the preceramic resin is impregnated with the filler material (e.g., formed around particles of the filler material). The filler material may be used to modify the mechanical characteristics of the resin, polymer, and/or ceramic material, and for example, may be used to increase the toughness of the fugitive mold.

The geometric shape of the filler is not particularly limited. In some embodiments, the filler material may be provided in the form of small particles, microparticles, fibers, whiskers, nanorods, chips, platelets, nanoplates etc., or a mixture of shapes. The size (average diameter or length) of the filler material is not particularly limited as long as it does not negatively impact the 3D printing process, for example, by causing ink discontinuities, and as long as the resulting polymer and ceramic has a desired degree of surface roughness and printing resolution. In some embodiments, the filler material particles, rods, etc. may have a diameter or length of about 1 micron to about 100 microns, about 10 microns to about 75 microns, or about 20 microns to about 50 microns. In some embodiments, when the filler particles are nanoscale, the filler material nanoparticles, nanorods, etc. may have a diameter or length of about 1 nm to about 1000 nm, about 10 nm to about 500 nm, about 20 nm to about 250 nm, or about 50 nm to about 100 nm. In some embodiments, the filler material particles may have a high aspect ratio to increase the fracture toughness of the fugitive mold. For example, the aspect ratio may be about 2:1 to about 100:1, or about 5:1 to about 50:1, or about 10:1 to 25:1.

In some embodiments, for example when the preceramic resin is cured by exposure to light, as described in further detail herein, the filler material may be UV transparent to prevent or reduce light scattering and to allow the resin to be evenly cured. In addition, the filler material may be selected to have a substantially similar index of refraction when compared to the index of refraction of the other components of the preceramic resin in order to prevent or reduce light scattering and internal reflection, which could potentially inhibit curing and reduce the printing resolution. Here, "substantially similar index of refraction" may refer to a difference of less than about ±50% compared to the preceramic resin, for example, about ±1% to about ±40% difference, about ±5% to about ±30% difference, about ±10% to about ±25% difference, or about ±15% to about ±20% difference.

In some embodiments, the filler material may be selected to have an expansion coefficient substantially similar to the expansion coefficient of the cured preceramic polymer in order to prevent or reduce strain in the fugitive mold caused by uneven expansion and/or contraction. Here, "substantially similar expansion coefficient" may refer to a difference of less than about ±50% difference compared to the preceramic resin, for example, about ±1% to about ±40% difference, about ±5% to about ±30% difference, about ±10% to about ±25% difference, or about ±15% to about ±20% difference. Further, the filler material may be selected to be stable at the temperatures used for pyrolysis, as described below, so that the filler material does not disintegrate, melt, vaporize, or otherwise react in a way that would negatively impact the structure or integrity of the fugitive mold prior to casting.

In some embodiments, the filler material may include a silicon-based material or ceramic such as quartz or glass ($SiO_2$), silicon oxycarbide (SiOC), silicon carbonitride (SiCN), silicon carbide (SiC), silicon carbon boronitride (SiCBN), silicon nitride ($Si_3N_4$), etc.; a non-silicon based material or ceramic such as yttrium aluminum garnet ($Y_3Al_5O_{12}$, YAG), alumina ($Al_2O_3$), mullite ($3Al_2O_3.2SiO_2$ and/or $2Al_2O_3.SiO_2$), zirconia ($ZrO_2$), titania ($TiO_2$), and other metal oxides, etc.; a nitride-based ceramic such as boron nitride (BN), titanium nitride (TiN), zirconium nitride (ZrN), and other metal nitrides; or mixtures thereof. In some embodiments, the filler material may include short fibers of a material capable of transmitting some UV light, including $Al_2O_3$, $SiO_2$, $Si_3N_4$, BN, YAG, or a mixture thereof. In some embodiments, the filler material may include short fibers of a material such as SiC or C covered with a reflective coating to reduce absorption of UV light.

In some embodiments, the filler materials may be coated with a protective layer to reduce heat-induced degradation of the filler material caused by the release of reactive oxygen species (ROS) during pyrolysis. For example, the protective layer may include BN. In some embodiments, the filler materials may be coated with a sacrificial layer that can react with the ROS in place of the filler material. For example, the sacrificial layer may include carbon, pyrolytic carbon, etc.

In some embodiments, for example when the filler material has a high aspect ratio, the filler material may be further coated with a filler/matrix interfacial coating in order to reduce penetration of matrix cracks into the filler material, thereby increasing the damage toughness and tolerance of the fugitive mold. The filler/matrix interfacial coating may be selected to be chemically and mechanically stable during 3D printing and pyrolysis. For example, the filler/matrix interfacial coating may include BN, C, and/or aluminum nitride (AlN).

In some embodiments, the filler material may be surface treated to increase its compatibility with the other components in the preceramic resin. For example, the filler material may be surface treated to increase its wetting capacity, solubility, or dispersion in the resin, and/or ability to form intermolecular bonds between the filler material and the polymerizable components of the resin.

In some embodiments, one or more functional groups may be covalently bonded to the surface of the filler material particles. For example, silane surface modifiers such as mercapto trimethoxy silane, vinyl trimethoxysilane, or 3-glycidyl oxypropyl trimethoxy silane may be added to the preceramic resin to add silane and/or siloxane groups to the filler material as covalently bonded surface groups. In some embodiments, the covalently bonded surface groups may enable the filler material to react with other functional groups in the preceramic resin and/or polymer. In some embodiments, the covalently bonded surface groups may increase the solubility or wettability of the filler material with respect to the liquid resin, thereby enabling increased mixing and dispersion.

In some embodiments, the preceramic resin may further include a dispersion aid (dispersant) to reduce clumping and to increase mixing of the filler material in the liquid preceramic resin. For example, the dispersion aid may be used to match the isoelectric point of the filler material particles with the isoelectric point of functional groups in the preceramic resin, thereby reducing segregation of each. In some embodiments, the preceramic resin may further include a surfactant having a functional group that can bond to the surface of the filler material as well as a functional group that can solvate in the liquid preceramic resin, thereby mediating or increasing solubility of the filler material in the resin.

The amount of filler material included in the preceramic resin may be about 0 volume % to about 70 volume %, for example, about 10 volume % to about 60 volume %, about 20 volume % to about 50 volume %, or about 30 volume % to about 40 volume % with respect to the total volume of resin.

Any suitable 3D printing method or technique may be used to deposit the preceramic resin, including stereolithography, DIW, binder jetting, vat polymerization, fused deposition modeling (FDM), etc. In some embodiments, the 3D printing may be achieved using stereolithography. In some embodiments, the 3D printing may be achieved using DIW. Those having ordinary skill in the art are capable of selecting 3D printing techniques and parameters suitable for use with the embodiments described herein.

In some embodiments, the solid portion of the fugitive mold may be printed as a solid mass, such that the only empty (e.g., negative) space in the fugitive mold is the fillable portion. In some embodiments, the fugitive mold may be printed to include negative spaces, holes, etc., to reduce the mass of the printed solid portion. The negative spaces, holes, etc. are separate (physically segregated) from the fillable portion, and do not enable leakage of molten metal from the fillable portion. In some embodiments, portions of the fugitive mold that are not contiguous with the fillable portion may include structures such trusses, columns, lattices, honeycombs, foams, etc., that include substantial volumes of negative space, but can provide mechanical and structural support to the mold along the positive printed portions. In some embodiments, the fugitive mold may have the form of a skin or shell that forms a solid, 2D plane against the sides of the metal part to be cast, where the skin or shell is additionally supported by trusses, columns, lattice, honeycombs, and/or foams. Additional description of trusses used for structural support and methods of 3D printing such trusses can be found in, e.g., U.S. Pat. No. 8,197,930, filed in the U.S. Patent and Trademark Office on May 20, 2017, the entire content of which is incorporated herein by reference.

In some embodiments, the solid portion of the fugitive mold may have the form of a 3D printed skin or shell that forms a solid surface or boundary against and/or around the sides of the metal part to be cast, where the outside perimeter of the 3D printed skin or shell (e.g., the side that does not face the part) may be further physically supported by molded sand. The molded sand may be easily physically separated from the skin or shell at a later stage.

The fugitive mold may be printed to have or include any shape, form, or physical feature as long as the parts of the mold will be suitably stable with respect to each other after completion (e.g., the fugitive mold will be transportable as a single piece and able to maintain a generally constant shape). In some embodiments, the fugitive mold may include features such as internal cores, cooling channels, etc. In some embodiments, the features may be supported by trusses, columns, etc., as described above.

The preceramic resin used to print the fugitive mold may undergo one or more polymerization reactions, as described above, to form a preceramic polymer. In some embodiments, the method of producing a cast-metal part may further include curing the preceramic resin to form a preceramic polymer.

In some embodiments, polymerization (curing) of the preceramic resin may be accomplished by heating. The temperature used for curing may be any temperature capable of initiating the polymerization reactions without also causing unwanted melting, degradation, side reactions, etc. For example, the curing temperature may be between about 80° C. to about 400° C., about 120° C. to about 350° C., about 150° C. to about 300° C., or about 200° C. to about 300° C., but embodiments of the present disclosure are not limited thereto. The total curing time may be any length of time necessary for the fugitive mold to attain a stable shape (e.g., a shape that is not easily deformed during transport and/or storage). In addition, the preceramic resin may include additional components, such as free radical inhibitors and/or free radical thermal initiators to control and/or facilitate the thermal polymerization reactions. Those having ordinary skill in the art are capable of selecting compositions, curing temperatures, and curing times suitable for use with the embodiments described herein.

In some embodiments, polymerization (curing) of the preceramic resin may be photoactivated (e.g., accomplished by radiation). For example, the intermolecular reactions between the at least one organic functional group on each of the one or more monomers, oligomers, and/or crosslinkers in the preceramic resin may be triggered by exposure to electromagnetic radiation (light) having a suitable wavelength. In some embodiments, the light may be ultraviolet (UV) light having a wavelength of about 200 nm to about 460 nm, and the resin may be described as being "UV-curable". The total time of exposure to light may be any length of time necessary for the fugitive mold to attain a stable shape. In addition, the preceramic resin may include additional components, such as photoinitiators, photo acid generators, UV sensitizers, hydrogen donors, free radical inhibitors, UV absorbers, fluorescents, and/or optical brighteners to facilitate various aspects of the photoactivated polymerization Those having ordinary skill in the art are capable of selecting compositions (additives), curing wavelengths, and curing times suitable for use with the embodiments described herein.

In some embodiments, for example when 3D printing is achieved using SLA, deposition and curing of the resin to form a preceramic polymer may occur simultaneously. For example, successive layers of a liquid photoactive resin in a tank may be immediately solidified and added to a polymer structure upon exposure to light. In some embodiments, for example when 3D printing is achieved using DIW, deposition and curing of the resin may occur in stages. For example, one or more layers of resin may remain in a liquid or viscous state immediately after being deposited by a print head, and may be cured only upon subsequent exposure to heat and/or light. In some embodiments, the fugitive mold may be subjected to more than one curing process, or additional thermal or UV treatments in order to ensure complete polymerization and solidification.

Additional descriptions of 3D printing using photoactivated preceramic resins, particularly as used in SLA, can be found in, e.g., U.S. Pat. No. 7,687,132, filed in the U.S. Patent and Trademark Office on Mar. 5, 2008, the entire content of which is incorporated herein by reference.

FIG. 1 is a schematic flowchart diagram describing the use of a UV curable preceramic resin in a SLA device to form the solid portion of a 3D printed fugitive mold. In FIG.

1, a preceramic resin 10 according to embodiments of the present disclosure includes at least one of UV curable preceramic monomers 12, 14, and 16, each including Si as an inorganic atom precursor to the ceramic fugitive mold product. In the structures of 12, 14, and 16, n may be any positive integer, and in some embodiments, n may be an integer of 1 to 10. The polymerizable functional groups are understood to be connected to the ends of the structure (e.g., outside of the brackets). However, it will be understood that embodiments of the present disclosure are not limited to the depicted mixture of resin components or their particular structures. In some embodiments, for example, the functional groups may be present as side chains, for example, in $R_1$ and $R_2$. The preceramic resin 10 is placed in a stereolithography tank 20 including a build platform 22, a UV laser 24, and other optical components (e.g., a scanning mirror 26) that allows light in the form of the UV laser 24 to be controllably aimed at the preceramic resin 10 in the tank 20. The preceramic resin 10 above the build platform 22 can thus be polymerized (cured), layer by layer, into a preceramic polymer shape 30. The preceramic polymer shape 30 is then optionally subjected to additional UV and/or thermal post-curing, yielding a completed preceramic polymer fugitive mold 32. The preceramic polymer fugitive mold 32 is subjected to pyrolysis to convert the preceramic polymer into a metastable ceramic material 34 so that the fugitive mold can be used with molten metal or alloy.

In some embodiments, the method of producing a cast-metal part may further include pyrolyzing the fugitive mold to convert the preceramic polymer to a metastable ceramic material. As used herein, the terms "pyrolysis", "pyrolyzing", and related terms are used in their art-recognized sense to refer to any thermal treatment, generally carried out in the absence or near-absence of oxygen, that results in at least partial decomposition of the material being treated, for example, to thereby form a product material having desired properties. For example, the pyrolysis atmosphere may include less than about 1 oxygen with respect to other gases. Here, pyrolysis of the fugitive mold may result in partial decomposition of the preceramic polymer to form a densified ceramic material suitable for use in investment casting, concomitant with the release of at least some of the organic components of the preceramic polymer as gas.

In some embodiments, pyrolysis may be carried out under an inert atmosphere, for example, nitrogen ($N_2$), argon (Ar), or a mixture thereof. In some embodiments, pyrolysis may be carried out under a reactive gas that is able to react with a component of the preceramic polymer and cause it to leave (e.g., be separated from) the material, or alternatively modify the ceramic material. Non-limiting examples of such reactive gases may include methane ($CH_4$), ethane ($C_2H_6$), ethene ($C_2H_4$), carbon monoxide (CO), carbon dioxide ($CO_2$), or a mixture thereof. In some embodiments, pyrolysis may be carried out under a reduced pressure or vacuum.

The preceramic polymer may be pyrolyzed at any suitable temperature as long as it is effective for the pyrolysis reactions, as determined by the composition of the preceramic polymer. In some embodiments, the preceramic polymer may be heated at a rate of about 0.1° C./min to about 20° C./min from ambient temperature (e.g., about 25° C.), for example, about 1° C./min to about 10° C./min. In some embodiments, the pyrolyzing may be carried out at about 700° C. to about 1500° C., for example, about 800° C. to about 1300° C., or about 800° C. to about 1100° C. The preceramic polymer may be pyrolyzed for any suitable duration, e.g., until pyrolysis is complete, for example, about 10 min to about 40 min, or 15 min to about 30 min. The pyrolyzed ceramic may then be cooled at a rate similar to that described for heating.

After pyrolysis, the fugitive mold may be composed of any suitable metastable ceramic material. As described above, the fugitive mold may thus be stable during metal casting for a limited period of time, but may be unstable when exposed to high temperatures for a prolonged period of time. For example, the metastable ceramic material may be composed or selected so that the metastable phase is relatively stable (e.g., non-reactive) at a molten metal temperature over a first length of time corresponding to the duration of exposure to the molten metal temperature, during which the metal is allowed to passively and/or actively cool. The metastable ceramic material may also be capable of (eventually) undergoing one or more conversion reactions to a gas-containing phase, such that fragmentation or disintegration of the ceramic material occurs as the gaseous phase portion of the new phase is separated from the solid phase portion of the new phase of the material. Furthermore, these phase conversion reactions may be able to occur at a temperature that is higher than room temperature (25° C.), but lower than the melting point of the metal (e.g., after the metal part has solidified, and so the part can remain in a solid phase) when exposed to such temperatures for a second length of time that is longer than the first length of time.

In some embodiments, for example, the metastable ceramic material may be composed or selected so that the rates of the phase conversion reactions are slow enough that they do not substantially impact the integrity of the fugitive mold structure at the molten metal temperature over the first length of time, but are able to impact (e.g., decrease) the structural integrity of the fugitive mold over the second length of time, wherein the second length of time is necessarily longer than the first length of time because the rate of reaction is slower at the lower temperature, as predicted by the Arrhenius equation. As such, the choice or composition of metastable ceramic material may be matched to the melting point of the metal or alloy as well as the first and second lengths of time.

In some embodiments, the metastable ceramic material may have an empirical formula including an oxide (oxygen), carbide (carbon), boride (boron), nitride (nitrogen), or sulfide (sulfur) group, or a combination of such groups, such as oxycarbide (oxygen-carbon), oxynitride (oxygen-nitrogen), carbonitride (carbon-nitrogen), oxycarbonitride (oxygen-carbon-nitrogen), etc. As discussed above, in some embodiments, the metastable ceramic material may have an empirical formula including one or more inorganic atoms or groups as derived from the preceramic resin and/or polymer.

In some embodiments, the metastable ceramic material may be an amorphous ceramic (amorphous material). The amorphous ceramic may be kinetically stabilized, but thermodynamically unstable with respect to another phase of the ceramic material, such as a crystalline ceramic phase. Here, the term "kinetically stabilized" is used in its art-recognized sense to indicate that the phase is capable of being converted to a lower energy phase, but only with substantial and/or prolonged energy input as needed to overcome the kinetic (energy) barrier to reaction, and as described in further detail below. In some embodiments, the metastable ceramic material may be an amorphous silicon oxycarbide ceramic. The term "silicon oxycarbide ceramic", as used herein, may refer to any ceramic material including a mixture of silicon (Si), oxygen (O), and carbon (C) atoms. In some embodiments, the ceramic material may further include other atoms or elements, and it will be understood that the term may refer to ceramics that are based on, but not limited to, a silicon oxycarbide system or composition.

Figure 2:
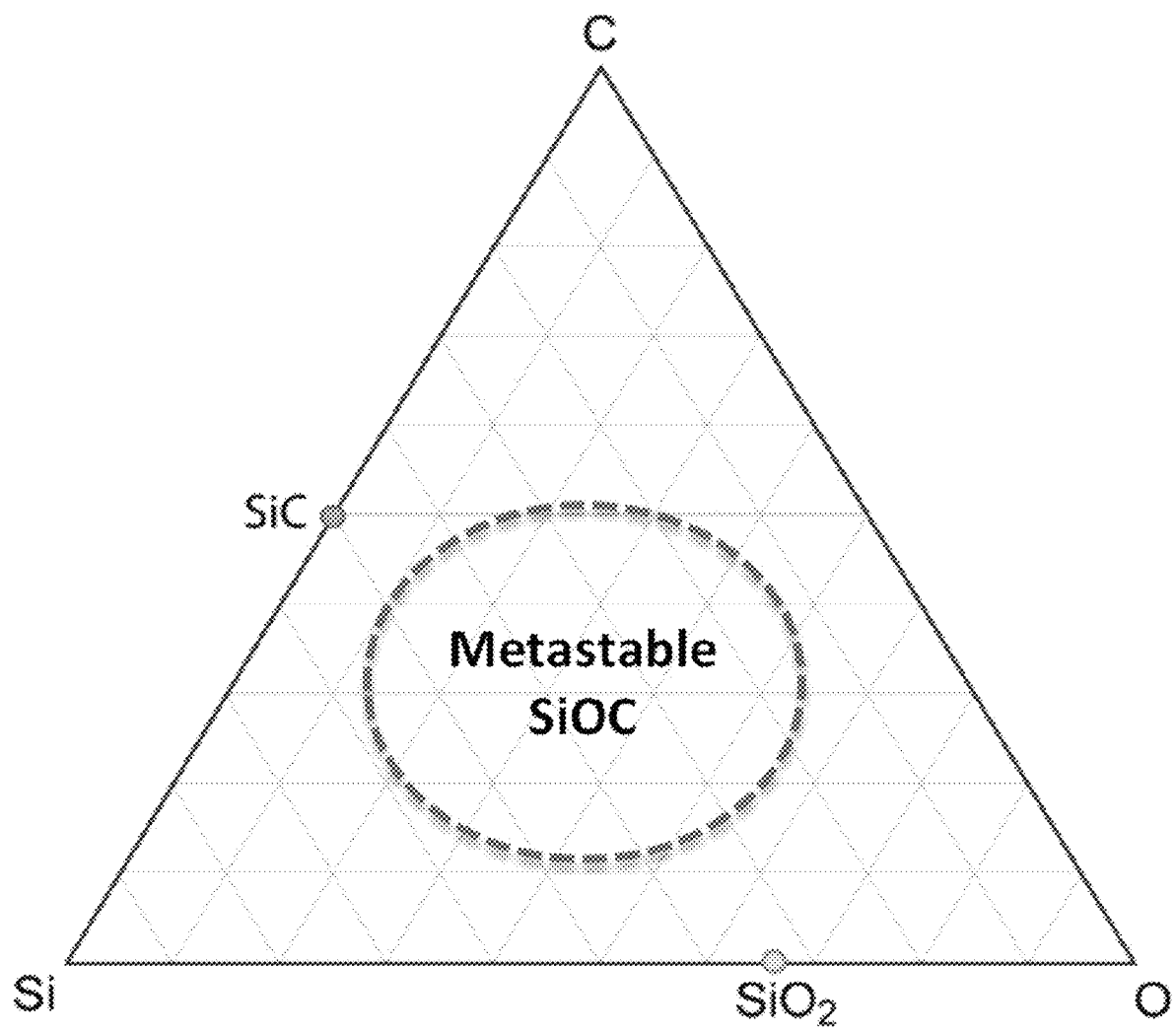
FIG. 2 is a schematic phase diagram for the ternary Si—O—C (silicon-oxygen-carbon) system with the approximate extension of the metastable silicon oxycarbide phase outlined.

FIG. 2 is a schematic phase diagram for the ternary Si—O—C (silicon oxygen carbon) system with the approximate extension of the metastable silicon oxycarbide phase outlined. The labeled points corresponding to Si, C, $SiO_2$, and SiC on the perimeter of the diagram are the only known stable solid phases in this system (e.g., materials that cannot be converted into thermodynamically more stable phases). As represented by the dashed elliptical region labeled "Metastable SiOC", there are no known stable (equilibrium) phases in the interior of the three-phase field. However, amorphous SiOC phases can be formed when preceramic polymers are pyrolyzed in the absence of oxygen. Such SiOC phases may be metastable, and given sufficient time, may be converted into one or more equilibrium phases. Such conversions can be accelerated by exposing the metastable material to increased temperatures, as predicted by the Arrhenius equation.

In some embodiments, the amorphous silicon oxycarbide ceramic included in the fugitive mold may include silicon in an amount of about 10 to 60 atom %, carbon in an amount of about 10 to 60 atom %, and oxygen in an amount of about 10 to 60 atom %. In some embodiments, the amorphous silicon oxycarbide ceramic may include silicon in an amount of about 10 to 50 atom %, 10 to 40 atom %, 10 to 30 atom %, or 15 to 25 atom %; carbon in an amount of about 15 to 50 atom %, 20 to 40 atom %, or 25 to 35 atom %; and oxygen in an amount of about 10 to 50 atom %, 20 to 50 atom %, 30 to 50 atom %, or 35 to 45 atom %. In some embodiments, the amorphous silicon oxycarbide ceramic may include silicon in an amount of about 25.4 atom %, carbon in an amount of about 31.5 atom %, and oxygen in an amount of about 43.2 atom %.

In some embodiments, the metastable ceramic may further include up to 20 atom % nitrogen (N), for example, about 0 atom % to 20 atom %, about 1 atom % to 15 atom %, or about 5 atom % to 10 atom %.

In some embodiments, the metastable ceramic may further include up to 20 atom % boron (B), for example, about 0 atom % to 20 atom %, about 1 atom % to 15 atom %, or about 5 atom % to 10 atom %.

In some embodiments, the metastable ceramic may further include up to 20 atom % sulfur (S), for example, about 0 atom % to 20 atom %, about 1 atom % to 15 atom %, or about 5 atom % to 10 atom %.

In some embodiments, the metastable ceramic may further include up to 20 atom % hydrogen (H), for example, about 0 atom % to 20 atom %, about 1 atom % to 15 atom %, or about 5 atom % to 10 atom %.

In some embodiments, the metastable ceramic may further include up to 20 atom % of a metal, for example, about 0 atom % to 20 atom %, about 1 atom % to 15 atom %, or about 5 atom % to 10 atom %. In some embodiments, the metal may be selected from aluminum (Al), magnesium (Mg), calcium (Ca), or strontium (Sr); a transition metal such as nickel (Ni), cobalt (Co), iron (Fe), or manganese (Mn); a refractory metal such as zirconium (Zr), hafnium (Hf); and other elements and combinations thereof.

In some embodiments, the metastable ceramic material may be intermixed with a filler material, as described herein with respect to the preceramic resin. The filler material may be compositionally distinct from the metastable ceramic material. In some embodiments, the filler may be inert or in a stable (equilibrium phase). In some embodiments, the filler may also be a metastable material or be otherwise subject to degradation. In some embodiments, the solid portion of the fugitive mold may include the metastable ceramic material in an amount of greater than about 50% by volume, for example, about 55% to about 95%, about 60% to about 90%, or about 70% to about 80%, and the remaining volume of the solid portion may be or include the filler material.

In some embodiments, the metastable ceramic material may be intermixed with particles, crystals, regions, or domains including a stable ceramic material, for example, Si, C, $SiO_2$, and SiC, that are formed during processing of the preceramic polymer. In some embodiments, the solid portion of the fugitive mold may include the metastable ceramic material in an amount of greater than about 50% by volume, for example, about 55% to about 95%, about 60% to about 90%, or about 70% to about 80%, and the remaining volume of the solid portion may be or include the stable ceramic material.

In some embodiments, the solid portion of the fugitive mold may include the metastable ceramic material in an amount of about 20% to about 50% by volume, for example, about 30% to about 40% by volume, and the remaining volume of the solid portion may include or be composed of sand (such as molded sand, as described above).

The fugitive mold, when composed of the metastable ceramic material, may retain the same or similar physical features as discussed above with respect to the fugitive ceramic mold when initially 3D printed and composed of the preceramic polymer. The fugitive mold composed of the metastable ceramic material may be proportionately smaller than the originally printed preceramic fugitive mold due to densification of the polymer material into the ceramic material. In some embodiments, the fugitive mold composed of the metastable ceramic material may include a core defining an interior feature of the cast-metal part. In some embodiments, the fugitive mold may include one or more cooling channels to be formed in the cast-metal part.

In some embodiments, the method of producing a cast-metal part may further include filling the fugitive mold with a liquid metal or alloy, and allowing the liquid metal or alloy to solidify over a first length of time, thereby forming a cast-metal part embedded in the fugitive mold.

Any suitable metal or alloy may be compatibly cast in the fugitive mold as long as the rate of degradation of the metastable ceramic material at the molten temperature of the metal or alloy is slow enough that the mold remains substantially structurally intact during the cooling period (e.g., the mold maintains its shape and integrity at least until after the metal part has solidified). Non-limiting examples of metals or alloys that are frequently used in investment casting include copper (m.p. 1083° C.), cast iron (m.p. 1204° C.), nickel (m.p. 1452° C.), stainless steel (m.p. about 1510° C.), carbon steel (m.p. about 1425° C. to about 1540° C.), nickel based alloys, cobalt based alloys, refractory alloys, etc. In some embodiments, the molten metal or alloy may expose the mold to a temperature of up to about 1800° C., a temperature of up to about 1700° C., a temperature of up to about 1600° C., or a temperature of up to about 1500° C.

The first length of time may be any time duration that is sufficiently long enough for at least an outer portion of the metal to solidify, and in some embodiments, may be sufficiently long enough so that the entire metal part is solidified. In some embodiments, for example, the first length of time may be about 0.1 hrs to about 1 hrs, about 0.2 hrs to about 0.4 hrs, or about 0.3 hrs to about 0.5 hrs. In some embodiments, the metal part may be allowed to passively cool, for example, by turning off or reducing the operating temperature of the heating element or furnace.

In some embodiments, the method of producing a cast-metal part may further include actively cooling the liquid metal or alloy to reduce or control the first length of time. In some embodiments, for example, the liquid metal or alloy may be cooled by exposing the cast metal part to a liquid or gas coolant having a temperature lower than the temperature of the molten metal part. In some embodiments, cooling of the liquid metal or alloy may be facilitated by the use of thermally conductive heat sinks that may be attached to the fugitive mold and/or metal part in order to conductively draw heat away from the part, and/or to radiatively disperse heat over a larger surface area. The coolant temperature and/or heat sinks may be varied and/or selected so that the cooling rate may be controlled, for example, at a rate of about 1° C./min to about 5° C./min. However, embodiments of the present disclosure are not limited thereto, and those of skill in the art are capable of selecting cooling rates so that the metal or alloy part maintains desirable mechanical properties and does not develop flaws such as stress and fractures. In some embodiments, the temperature endpoint may be the same temperature as discussed below with respect to disintegration of the metastable ceramic material.

After the metal or alloy part solidifies, the part can be separated from the fugitive mold. In some embodiments, the method of producing a cast-metal part may further include heating the fugitive mold at a temperature lower than the melting point of the cast-metal part for a second length of time longer than the first length of time to disintegrate the metastable ceramic material. The disintegration of the metastable ceramic material, which occurs as a result of the phase changes described above, may allow the fugitive mold to be easily separated from the cast metal or alloy part without subjecting the part to caustic chemical processing. In some embodiments, the disintegration may result in the release of one or more gases derived from the fugitive mold material, such as $O_2$, SiO, CO, $NO_2$, $SO_2$, etc. In some embodiments, more than about 50% of the initial ceramic mass of the fugitive mold may be lost to gases, for example, about 60% to about 90% of the initial ceramic mass, or about 70% to about 80% of the initial ceramic mass.

In some embodiments, the fugitive mold may be disintegrated by exposure (heating) to a temperature at about 90% of the melting point of the metal or alloy. For example, the temperature lower than the melting point of the cast-metal part (the disintegration temperature) may be about 10% to about 50% lower than the melting point of the metal or alloy, for example, about 12% to about 40% lower, about 15% to about 30% lower, or about 20% to about 25% lower. However, embodiments of the present disclosure are not limited thereto, and the fugitive mold may be disintegrated by exposure to any temperature that is sufficiently high enough so that disintegration occurs on an industrially-relevant time scale (as calculated according to the desired cost of production), but is low enough so that the metal or alloy part is not melted down, deformed, destroyed, or otherwise rendered unsuitable for its intended use. The second length of time used for disintegrating the fugitive mold may be any time duration (reaction time) that enables the mold to break down to a point where it can be separated from the metal part without risk of damaging the part. In some embodiments, for example, the second length of time may be up to about 12 hours, up to about 8 hours, or up to about 4 hours.

In some embodiments, for example when the fugitive mold and cast metal part are cooled to, e.g., room temperature or any temperature requiring reheating, the heating rate may be between about 0.1° C./min to about 20° C./min, for example, about 1° C./min to about 15° C./min, or about 5° C./min to about 10° C./min.

In some embodiments, heating the fugitive mold at a temperature lower than the melting point of the cast-metal part may be carried out under an inert atmosphere, as defined above. For example, the atmosphere may include less than about 1% oxygen with respect to other gases. In some embodiments, the heating may be carried out under a vacuum or partial pressure. In some embodiments, the heating may be carried out under an atmospheric pressure of less than about 0.25 bar, for example, about 0.5 bar to about 0.2 bar, or about 0.1 bar to about 0.15 bar.

In some embodiments, heating the fugitive mold may be carried out in air or in the presence of oxygen. When the fugitive mold is heated in an oxygen-containing atmosphere, the duration of heating may be longer than that required when heating in an inert atmosphere such as Ar. For example, the second length of time may be up to about 20 hours, up to about 14 hours, or up to about 8 hours The chemical reactions that take place during heating of the fugitive mold are not particularly limited, and may be determined by the composition and structure of the metastable ceramic material, the heating temperature, and the atmosphere. In some embodiments, the metastable ceramic material and atmosphere may be selected so that carbothermal reduction (CTR) of SiOC and/or $SiO_2$-bound oxygen in the metastable ceramic material results in production and release of e.g., CO and/or $CO_2$. For example, CTR of the silicon oxycarbide material may proceed according to the equation SiOC $SiO_2$+CO.

In some embodiments, the method of producing a cast-metal part may further include physically separating the cast-metal part from fragments of the fugitive mold. In some embodiments, when the phase conversion reactions result in substantial disintegration so that the remaining solid phase portion of the fugitive mold is in the form of crystalline particles or fragments, the particles or fragments may be removed by mechanical means such as washing, air or water jetting, etc. In some embodiments, the structure of the fugitive mold may not be completely fragmented, but may be brittle and porous, and the brittle structure may be removed using stronger mechanical means such as abrasion, sonication, etc. In some embodiments, the brittle structure may be subjected to chemical removal using solutions that are less caustic than in the related art, or using smaller amounts or lower treatment times than in the related art. In some embodiments, the chemical removal may include treatment with an acid. In some embodiments, the chemical removal may include treatment with a base.

Figure 3:
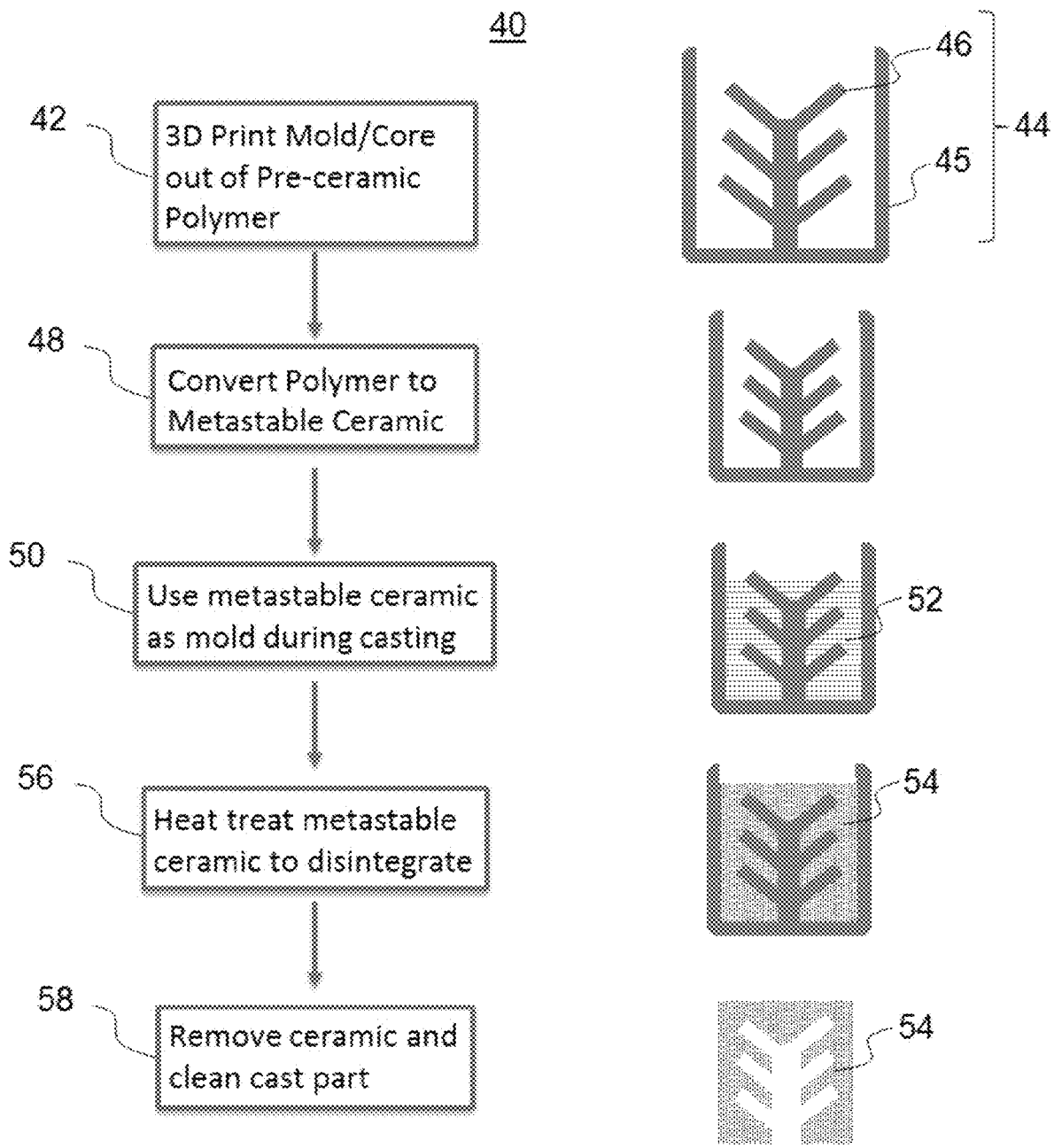
FIG. 3 is a flowchart summarizing the method of producing a cast-metal part according to embodiments of the present disclosure.

FIG. 3 is a flowchart 40 summarizing the method of producing a cast-metal part according to embodiments of the present disclosure. In task 42, a fugitive mold 44 including an outer wall 45 and an internal core 46 is formed by 3D printing a preceramic resin and curing to form a preceramic polymer. In task 48, the preceramic polymer is converted to an amorphous metastable ceramic, for example, by heating under Ar at a temperature of about 800° C. to 1100° C. Subsequently, in task 50, the ceramic fugitive mold 44 is filled with a molten metal or alloy 52 that is allowed to solidify, thereby forming a solid part 54. In task 56, the solid part 54 is removed from the ceramic fugitive mold 44 by heat-treating the fugitive mold 44 for a sufficiently long time until the metastable ceramic forming the fugitive mold 44 disintegrates. In task 58, the remaining solid part 54 is chemically and/or mechanically cleaned to remove any remnants of the fugitive mold 44.

The following examples and experimental data are provided for illustrative purposes only, and do not limit the scope of the embodiments of the present disclosure.

Example 1

A photoactive preceramic resin including a mixture of (mercaptopropyl) methylsiloxane and vinylmethoxysiloxane was 3D printed using SLA in a test shape as a proxy for a fugitive mold. The test shape was subjected to a UV post cure at 125 mW/cm$^2$ for about 2 min to ensure complete polymerization. Subsequently, the preceramic polymer test shape was pyrolyzed in a quartz tube furnace under an Ar atmosphere using a heating rate of 1° C./min up to a maximum temperature of 1000° C., a 60 min hold at 1000° C., and a cooling rate of 5° C./min back to room temperature. The composition of the silicon oxycarbide metastable ceramic material was measured using inductively coupled mass spectrometry to be 25.4 atomic percent (atom %) Si, 31.5 atom % C, and 43.2 atom % O, corresponding to an empirical formula of $SiO_{1.7}C_{1.25}$.

The test shape was then subjected to extended heating in order to simulate removal of the fugitive mold after investment casting. The test shape was heated in a quartz tube furnace under an Ar atmosphere using a heating rate of 1° C./min up to a maximum temperature of 1500° C., a 4 hr hold at 1500° C., and a cooling rate of 5° C./min back to room temperature.

Figure 4A:
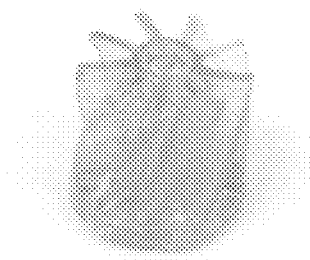
FIGS. 4A-4D are a series of photographic images showing the fugitive mold material of Example 1 after various processing tasks.
Figure 4B:
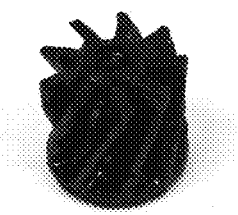
Figure 4C:
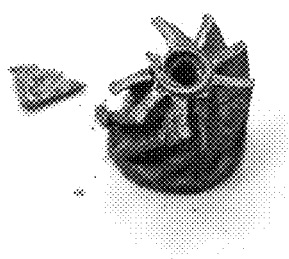
Figure 4D:
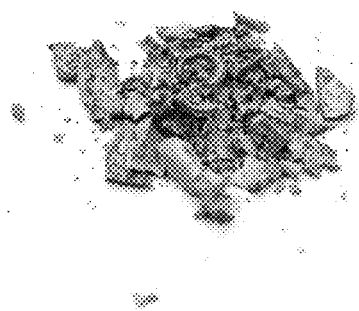

FIGS. 4A-4D are a series of photographic images showing the fugitive mold material of Example 1 during the various processing tasks. FIG. 4A is a photo of a 3D printed preceramic polymer test part after printing and post-curing. FIG. 4B is a photo showing the test part after conversion to a metastable ceramic by pyrolysis. FIG. 4C is a photo showing degradation of the test part after heating in Ar at 1500° C. for 4 hrs, and FIG. 4D is a photo showing near-total disintegration of the test part after being lightly touched. As such, the metastable ceramic material was found to be suitable for use as an easily removable fugitive mold material, for example, with a metal or alloy having a melting point above 1500° C. (such as a melting point of about 1650° C. to about 3000° C.).

The ability to produce a metastable ceramic mold using 3D printing techniques such as stereolithography and digital light processing enables the production and use of investing casting molds with complex features at high resolution.

The devices according to embodiments of the present disclosure may be useful for production of cast alloy parts in a wide range of industries. Non-limiting examples of applications of interest include: propulsion components with cooling holes (as used in rocket engines, jet engines, and exhaust structures), powertrain components cast out of steel, and gas turbine components with cooling holes (such as turbine blades, vanes, shrouds). However, embodiments of the present disclosure are not limited thereto.

As used herein, unless otherwise expressly specified, all numbers such as those expressing values, ranges, amounts or percentages may be read as if prefaced by the word "about", even if the term does not expressly appear. As used herein, the terms "substantially", "about", "nearly", and similar terms are used as terms of approximation and not as terms of degree, and are intended to account for the inherent deviations in measured or calculated values that would be recognized by those of ordinary skill in the art. Plural encompasses singular and vice versa. For example, while the present disclosure may describe "an" electrode or "a" substrate, a mixture of such electrodes or substrates can be used.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. As used herein, the terms "combination thereof" and "combinations thereof" may refer to a chemical combination (e.g., an alloy or chemical compound), a mixture, or a laminated structure of components.

It will be understood that although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath", "below", "lower", "under", "above", "upper", and the like, may be used herein for ease of explanation to describe one element or feature's relationship to another element(s) or feature(s) as illustrated in the accompanying drawings. It will be understood that the spatially relative terms are intended to encompass different orientations of the device in use or in operation, in addition to the orientations depicted in the accompanying drawings. For example, if the structures in the accompanying drawings are turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including", when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively.

While the subject matter of the present disclosure has been described in connection with certain embodiments, it is to be understood that the subject matter of the present disclosure is not limited to the disclosed embodiments, but, on the contrary, the present disclosure is intended to cover various modifications and equivalent arrangements included within the spirit and scope of the appended claims, and equivalents thereof.

What is claimed is:

1. A method of producing a cast-metal part, the method comprising:
   three-dimensionally (3D) printing a preceramic resin in a shape of a fugitive mold, the fugitive mold comprising a solid portion comprising a supportive solid surface around the outer and lower perimeter of a fillable portion;
   curing the preceramic resin to form a preceramic polymer;
   pyrolyzing the fugitive mold to convert the preceramic polymer to a metastable ceramic material comprising an amorphous silicon oxycarbide ceramic;
   filling the fillable portion of the fugitive mold with a liquid metal or alloy;
   allowing the liquid metal or alloy to solidify over a first length of time to form the cast-metal part embedded in the fugitive mold; and
   heating the fugitive mold at a temperature lower than the melting point of the cast-metal part for a second length of time longer than the first length of time to disintegrate the metastable ceramic material by a heat-induced phase change and remove the cast-metal part from the metastable ceramic material.

2. The method of claim 1, wherein the 3D printing is achieved by stereolithography.

3. The method of claim 1, wherein the 3D printing is achieved by direct ink write (DIW).

4. The method of claim 1, wherein the pyrolyzing is carried out at about 800° C. to about 1100° C. under an inert atmosphere.

5. The method of claim 1, wherein the allowing the liquid metal or alloy to solidify further comprises actively cooling the liquid metal or alloy.

6. The method of claim 1, wherein the heating of the fugitive mold is carried out for about 4 hours to about 12 hours at a temperature about 10% to about 50% lower than the melting point of the cast-metal part.

7. The method of claim 1, wherein the heating of the fugitive mold is carried out under an atmospheric pressure of less than about 0.25 bar.

8. The method of claim 1, wherein the amorphous silicon oxycarbide ceramic comprises silicon in an amount of about 10 to 60 atom %, carbon in an amount of about 10 to 60 atom %, and oxygen in an amount of about 10 to 60 atom %.

9. The method of claim 1, wherein the amorphous silicon oxycarbide ceramic comprises silicon in an amount of about 10 to 30 atom %, carbon in an amount of about 20 to 40 atom %, and oxygen in an amount of about 30 to 50 atom %.

10. The method of claim 1, wherein the amorphous silicon oxycarbide ceramic further comprises nitrogen in an amount of about 1 to 20 atom %.

11. The method of claim 1, wherein the amorphous silicon oxycarbide ceramic further comprises boron in an amount of about 1 to 20 atom %.

12. The method of claim 1, wherein the amorphous silicon oxycarbide ceramic further comprises a metal in an amount of about 1 to 20 atom %.

13. The method of claim 1, wherein the amorphous silicon oxycarbide ceramic further comprises sulfur in an amount of about 1 to 20 atom %.

14. The method of claim 1, wherein the amorphous silicon oxycarbide ceramic further comprises hydrogen in an amount of about 1 to 20 atom %.

15. A fugitive mold for producing a cast-metal part, the fugitive mold comprising a three-dimensionally (3D) printed solid portion comprising a supportive solid surface around the outer and lower perimeter of a fillable portion,
   the fillable portion corresponding to the cast-metal part;
   the solid portion comprising a metastable ceramic material;
   the metastable ceramic material being removable from the cast-metal part by a heat-induced phase change; and
   the metastable ceramic material comprising an amorphous silicon oxycarbide ceramic.

16. The fugitive mold of claim 15, wherein the solid portion comprises the metastable ceramic material in an amount of greater than about 50% by volume, and the remaining volume of the solid portion comprises particles of a non-metastable ceramic material.

17. The fugitive mold of claim 15, wherein the amorphous silicon oxycarbide ceramic comprises silicon in an amount of about 10 to 60 atom %, carbon in an amount of about 10 to 60 atom %, and oxygen in an amount of about 10 to 60 atom %.

18. The fugitive mold of claim 15, wherein the solid portion further comprises a core extending into the fillable portion to define an interior feature of the cast-metal part.

19. The fugitive mold of claim 15, wherein the solid portion further comprises one or more cooling channels to be formed in the cast-metal part.

* * * * *